United States Patent
Castano et al.

(10) Patent No.: US 11,341,789 B2
(45) Date of Patent: May 24, 2022

(54) REMOTE/OFFLINE PROCESSING OF VEHICLE DATA

(71) Applicant: Toyota Motor North America, Inc., Plano, TX (US)

(72) Inventors: Javier Castano, Dallas, TX (US); Michael B. Murray, Dallas, TX (US); Armin Lange, Addison, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 227 days.

(21) Appl. No.: 16/588,880

(22) Filed: Sep. 30, 2019

(65) Prior Publication Data
US 2021/0097784 A1 Apr. 1, 2021

(51) Int. Cl.
| G07C 5/08 | (2006.01) |
| G07C 5/00 | (2006.01) |
| H04L 67/12 | (2022.01) |
| B60L 58/12 | (2019.01) |
| B60R 16/023 | (2006.01) |

(52) U.S. Cl.
CPC .............. *G07C 5/085* (2013.01); *B60L 58/12* (2019.02); *B60R 16/0232* (2013.01); *G07C 5/008* (2013.01); *H04L 67/12* (2013.01)

(58) Field of Classification Search
CPC ...... G07C 5/008; H04L 67/12; B60R 16/0232
See application file for complete search history.

(56) References Cited

U.S. PATENT DOCUMENTS

| 7,348,895 | B2 | 3/2008 | Lagassey |
| 7,672,756 | B2 | 3/2010 | Breed |
| 8,200,376 | B2 | 6/2012 | Mattingly et al. |
| 8,935,057 | B2 | 1/2015 | Dolinar et al. |
| 9,384,402 | B1 | 7/2016 | Furman et al. |
| 9,804,012 | B2 | 10/2017 | Marumoto et al. |
| 9,922,567 | B2 | 3/2018 | Molin et al. |
| 10,097,671 | B2 | 10/2018 | Mullen et al. |
| 10,111,033 | B2 | 10/2018 | Acharya et al. |
| 10,228,934 | B2 | 3/2019 | Kurosawa et al. |
| 10,248,116 | B2 | 4/2019 | Okumura et al. |
| 10,257,468 | B2 | 4/2019 | Le-Bouedec |
| 10,459,444 | B1* | 10/2019 | Kentley-Klay ...... G05D 1/0027 |

(Continued)

OTHER PUBLICATIONS

US 10,241,966 B2, 03/2019, McQuade et al. (withdrawn)

*Primary Examiner* — Michael J Zanelli
(74) *Attorney, Agent, or Firm* — Snell & Wilmer LLP

(57) ABSTRACT

A system for controlling big data transfer from a vehicle to a server includes a plurality of vehicle sensors located on the vehicle and configured to detect vehicle data. The system further includes a memory located on the vehicle and configured to store the vehicle data. The system further includes a network access device located on the vehicle and configured to communicate with the server. The system further includes an electronic control unit (ECU) located on the vehicle, coupled to the plurality of vehicle sensors, the memory, and the network access device. The ECU is designed to analyze the vehicle data to identify prioritized vehicle data and other vehicle data within the vehicle data. The ECU is further designed to compress the prioritized vehicle data. The ECU is further designed to control the network access device to transmit the compressed prioritized vehicle data to the server.

19 Claims, 9 Drawing Sheets

(56) References Cited

U.S. PATENT DOCUMENTS

| | | | | |
|---|---|---|---|---|
| 10,880,361 B2* | 12/2020 | Boehm | ................... | H04L 67/12 |
| 2002/0169530 A1* | 11/2002 | Laguer-Diaz | ........... | B61L 3/125 |
| | | | | 701/31.4 |
| 2002/0188384 A1* | 12/2002 | Becker | .................. | G06F 9/5072 |
| | | | | 701/1 |
| 2013/0317711 A1* | 11/2013 | Plante | ................... | H04N 7/188 |
| | | | | 701/51 |
| 2016/0139594 A1* | 5/2016 | Okumura | ............... | B60W 30/00 |
| | | | | 701/2 |
| 2017/0032589 A1 | 2/2017 | Zagajac et al. | | |
| 2017/0142187 A1 | 5/2017 | Pimental | | |
| 2018/0261020 A1* | 9/2018 | Petousis | ................. | G07C 5/0841 |
| 2019/0222641 A1* | 7/2019 | Schmitt | .................. | H04L 67/12 |

* cited by examiner

REMOTE/OFFLINE PROCESSING OF VEHICLE DATA

BACKGROUND

1. Field

The present disclosure relates to systems and methods for sharing big data between vehicles and a server, and for utilizing the vehicles and server as a distributed processing system.

2. Description of the Related Art

Technology is becoming more ubiquitous in everyday life. This expansion of technology is not limited to any sector and, in particular, more and more sensors and other electronic gadgets are being installed in vehicles. These sensors can perform many functions such as identifying objects in an environment of the vehicle, determining a status of other vehicle components (such as detecting a tire pressure), or the like. The data from these sensors is helping vehicles perform impressive feats, up to and including some vehicles being able to drive themselves without driver input (i.e., capable of driving autonomously).

Some of this data is being analyzed and utilized in real time or near-real time as the vehicle is being driven. However, some analysis of this data may be too computationally expensive for the vehicle to perform in near-real time (or at all, in some cases). One potential solution is for the vehicle to transmit this detected data to a remote server and have the server perform the processing. However, due to the large number of sensors and other datapoints from vehicles, it does not make sense to transmit all of this raw data. In fact, the amount of data is so great that it may be impossible for some vehicles to transmit all detected vehicle data to a server.

Thus, there is a need in the art for systems and methods for improving data transfer from vehicles to servers.

SUMMARY

Described herein is a system for controlling big data transfer from a vehicle to a server. The system includes a plurality of vehicle sensors located on the vehicle and designed to detect vehicle data. The system further includes a memory located on the vehicle and designed to store the vehicle data. The system further includes a network access device located on the vehicle and designed to communicate with the server. The system further includes an electronic control unit (ECU) located on the vehicle, coupled to the plurality of vehicle sensors, the memory, and the network access device. The ECU is designed to analyze the vehicle data to identify prioritized vehicle data and other vehicle data within the vehicle data. The ECU is further designed to compress the prioritized vehicle data. The ECU is further designed to control the network access device to transmit the compressed prioritized vehicle data to the server.

Also disclosed is a system for controlling big data transfer from a vehicle to a server. The system includes a network access device located at the server and designed to receive compressed vehicle data corresponding to sensor data detected by sensors of multiple vehicles. The system further includes a memory located at the server and designed to store at least one of the compressed vehicle data or uncompressed vehicle data. The system further includes a data processor located at the server and coupled to the network access device and the memory. The data processor is designed to decompress the compressed vehicle data into the uncompressed vehicle data. The data processor is further designed to analyze the decompressed vehicle data to identify types of vehicle data that are prioritized vehicle data. The data processor is further designed to control the network access device to transmit identifiers of the prioritized vehicle data to the multiple vehicles such that future compressed vehicle data from the multiple vehicles includes the prioritized vehicle data.

Also disclosed is a method for controlling big data transfer from a vehicle to a server. The method includes detecting, by a plurality of vehicle sensors located on the vehicle, vehicle data. The method further includes storing, in a memory located on the vehicle, the vehicle data. The method further includes analyzing, by an electronic control unit (ECU) located on the vehicle, the vehicle data to identify prioritized vehicle data and other vehicle data within the vehicle data. The method further includes compressing, by the ECU, the prioritized vehicle data. The method further includes transmitting, by a network access device on the vehicle, the compressed prioritized vehicle data to the server.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling big data transfer between vehicles and a server, as well as for operating a distributed processing system between the vehicles and the server. The system provides various benefits and advantages such as increasing efficiency of data transfer between vehicles and a server, advantageously providing the server with higher-quality data and reducing unnecessary data transferred to the server. The system also provides the benefit of transferring lower priority, but still useful, data to the server when the vehicle is connected to a low-cost network (such as Wi-Fi), advantageously reducing data transfer costs for the vehicle. The system also advantageously can continuously or from time to time improve identification of prioritized data, regularly resulting in more valuable data reaching the server.

The server can advantageously request various vehicles to perform specific processing functions, thus providing the benefit of increasing computational power of the system that includes the server and the vehicles. This distributed processing system advantageously makes use of processing power of vehicles when the vehicles are off-line.

An exemplary system includes multiple vehicles having sensors and other components that generate data. The vehicles may also include an electronic control unit (ECU) which may analyze all of the vehicle data and assign a priority to each type of vehicle data. The ECU may also compress higher priority data and transmit the higher priority data to a server for further analysis. The ECU may also receive a request to perform processing on some of the data, and may perform the requested processing when a vehicle battery has sufficient power to perform the processing and the vehicle is in a non-use state (e.g., when parked). The system may also include a server that can receive the compressed data, decompress the data, and analyze the decompressed data. The server may further determine which types of data should be high priority and may transmit identifiers of the high priority data to the vehicles. The server may also determine processing functions that can be performed by one or more of the vehicles, and may assign the processing functions to specific vehicles.

Figure 1:
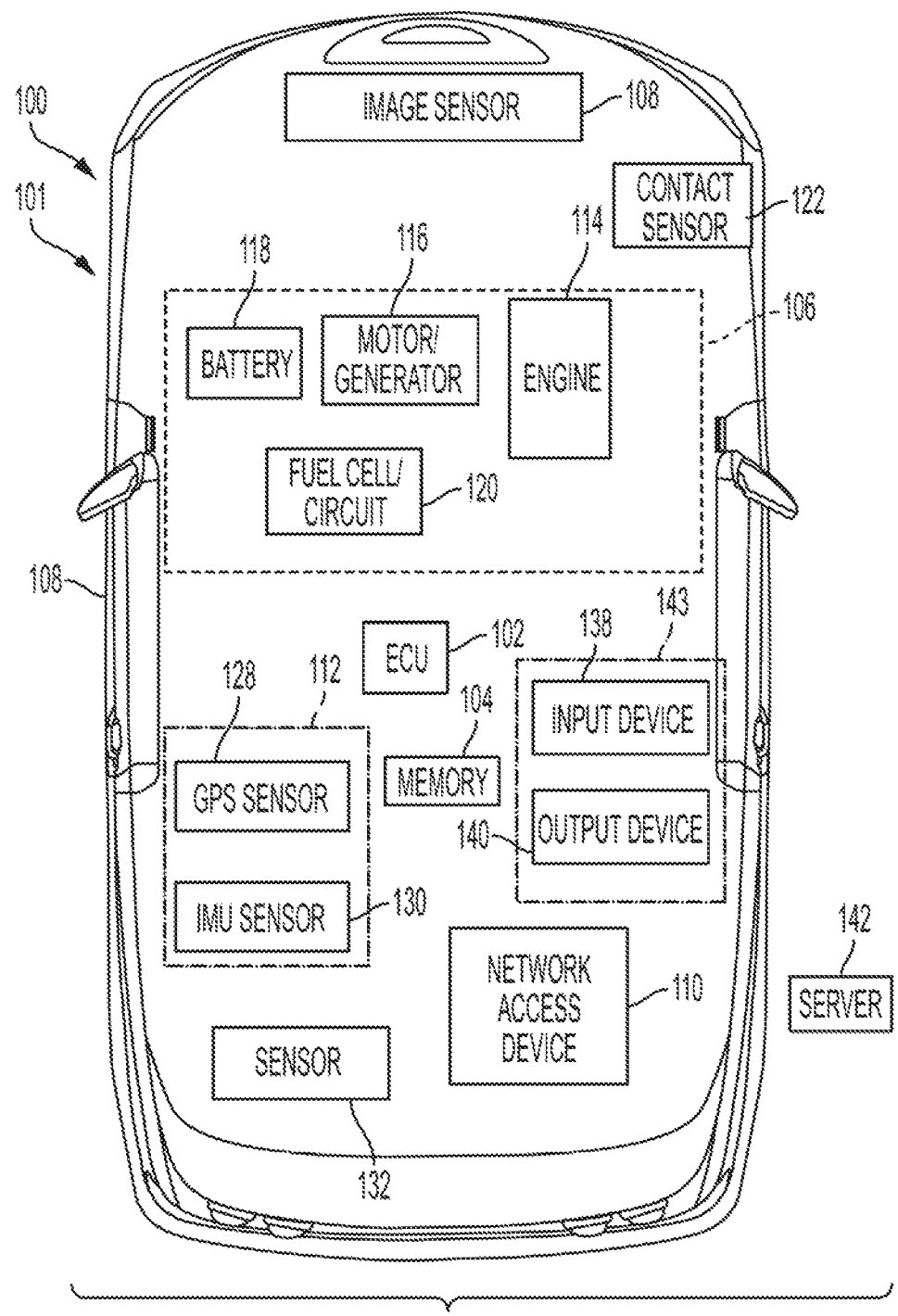
FIG. 1 is a block diagram illustrating a system for controlling data transfer between vehicles and a server, according to an embodiment of the present invention.

Turning to FIG. 1, a vehicle 100 may include a system 101 for data transfer between the vehicle 100 and a server 142. The vehicle 100 (or system 101) may include an ECU 102, a memory 104, and a power source 106. The vehicle 100 (or system 101) may further include a network access device 110, an image sensor 108, a location sensor 112, a contact sensor 122, and a sensor 132. The vehicle may have a main body 108, and may also include a multimedia unit 143 including an input device 138 and an output device 140.

The main body 108 may be propelled along a roadway, may be suspended in or on water, or may fly through air. The main body 108 may resemble a vehicle such as a car, a bus, a motorcycle, a boat, an aircraft, or the like. The main body 108 may further support one or more individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store data detected by the sensors, may store instructions usable by the ECU 102 to drive autonomously, or the like.

The power source 106 may include any one or more of an engine 114, a motor-generator 116, a battery 118, or a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The image sensor 108 may include any one or more of a camera, a radar detector, a light detection and ranging (LIDAR) sensor, or the like. The image sensor 108 may detect image data corresponding to light in one or more of the visible spectrum, the infrared spectrum, the ultraviolet spectrum, or any other light spectrum. The image sensor 108 may include one or more image sensor positioned around the main body 108, and may detect image data corresponding to objects within the main body 108 or outside of the main body 108.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The contact sensor 122 may include any sensor, such as a pressure sensor or IMU, that can detect contact between a portion of the vehicle 100 (such as the main body 108) and an object. The contact sensor 122 may include one or more sensor located in or on the vehicle 100. For example, the contact sensor 122 may detect if another vehicle initiates contact with the main body 108, indicating that an accident involving the vehicle 100 has occurred. In some embodiments, the IMU sensor 130 may function as the contact sensor 122. For example, if sudden acceleration is detected by the IMU sensor 130 then the ECU 102 may determine that the main body 108 has been struck by another object.

The sensor 132 may include one or more of the location sensor 112, the contact sensor 122, the image sensor 108, a sensor capable of detecting a status of a vehicle component (e.g., a sensor to detect whether power steering is operating correctly), a sensor capable of detecting environmental conditions (including weather), or the like. As additional examples, the sensor 132 may include one or more of a grade sensor designed to detect a grade of a current roadway, an altimeter designed to detect an altitude of the vehicle 100, a speed sensor (such as an angular velocity sensor coupled to one or more wheel) designed to detect a speed of the main body 108, or the like. The sensor 132 may also or instead include one or more of a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle such as data from the remote server 142.

The network access device 110 may include any network access device capable of communicating via one or more wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device.

The network access device 110 may communicate with the remote server 142 (such as a cloud server or other central server). The remote server 142 may receive data from the vehicle 100 (such as sensor data). The remote server 142 may perform processing functions on the data from the vehicle, and may make determinations based on the processing. For example, if a crash is detected by one or more sensor of the vehicle 100 then all detected data may be transmitted to the server 142, and the server 142 may analyze the data to identify the cause of the crash. As another example, the server 142 may receive data detected by vehicle sensors at various times, and may analyze the data to improve functioning of one or more vehicle component. For example, the server 142 may determine that operation of autonomous driving may be improved based on the analysis of the received data.

Because vehicles include more and more sensors and therefore collect larger and larger amounts of data, it may be relatively expensive to transfer all data to the server 142 as it is detected (e.g., data transfer costs, processing costs of the ECU 102, or the like). In that regard, the ECU 102 may be designed to select prioritized data to send to the server 142 and may compress the prioritized data prior to transmitting it to the server 142. Furthermore, the ECU 102 may learn when data transfer costs are relatively low (e.g., when connected to WIFI at a user's residence). The ECU 102 may store lower priority data in the memory 104 until the data transfer costs are relatively low, and then may transmit the lower priority data to the server 142 when the costs are relatively low.

The server 142 may perform a machine learning, or artificial intelligence, algorithm to learn what data should be prioritized and may transmit an algorithm back to the ECU 102 that allows the ECU 102 to select the prioritized data.

In some embodiments, the ECU 102 may from time to time perform calculations for the server 142. That is, the server 142 may transmit a request to the ECU 102 for the ECU 102 to process some data, either before transmission to the server 142 or on data already received by the server 142. In that regard, the server 142 and the ECU 102 (along with other ECUs of other vehicles) may function as a distributed processing system. In some embodiments, the ECU 102 may determine when it has the ability to process data (e.g., when charging at home, if an electric vehicle 100, or when not driving) and may process the data when it has the ability to do so without a reduction in driving performance.

Figure 2:
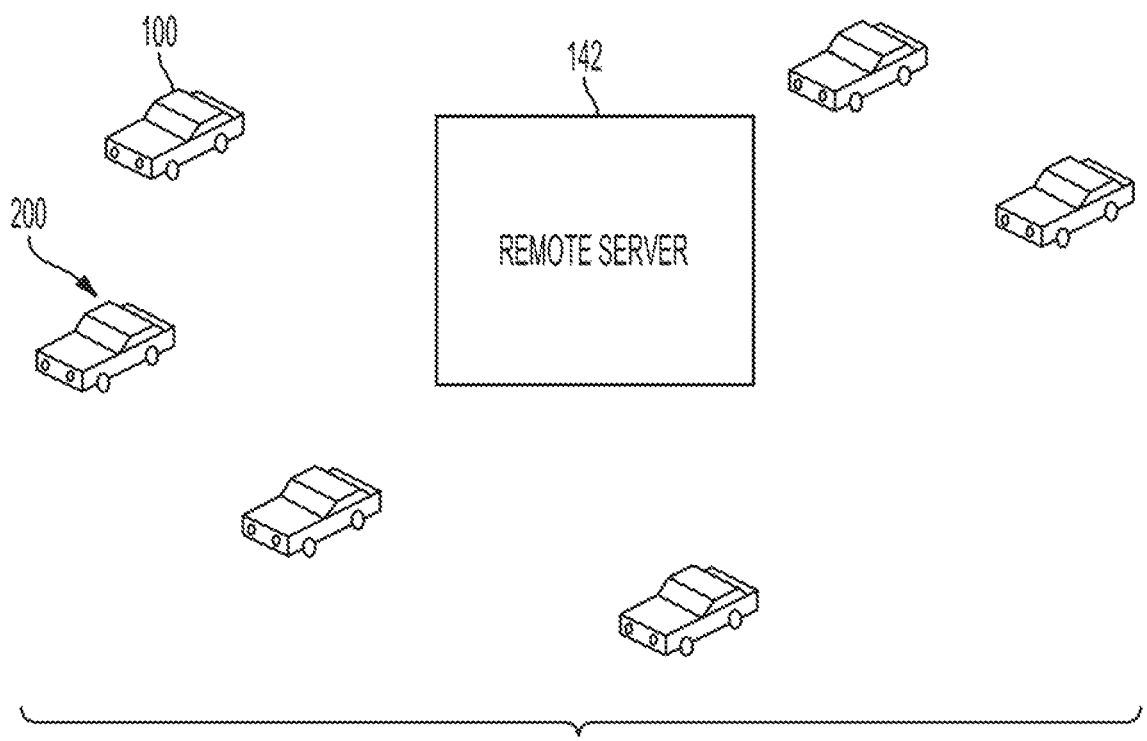
FIG. 2 is a block diagram illustrating a system for controlling data transfer between vehicles and a server, according to an embodiment of the present invention.

Referring now to FIG. 2, the remote server 142 may communicate with multiple vehicles 200 including the vehicle 100. The remote server 142 may receive data from some or all of the vehicles 200. The remote server 142 may aggregate and/or analyze the data, and may perform an action based on the analysis. In some embodiments, the remote server 142 may transfer processing requests to the vehicles 200, thus causing the server 142 and the vehicles 200 to function as a distributed processing system.

Figure 3:
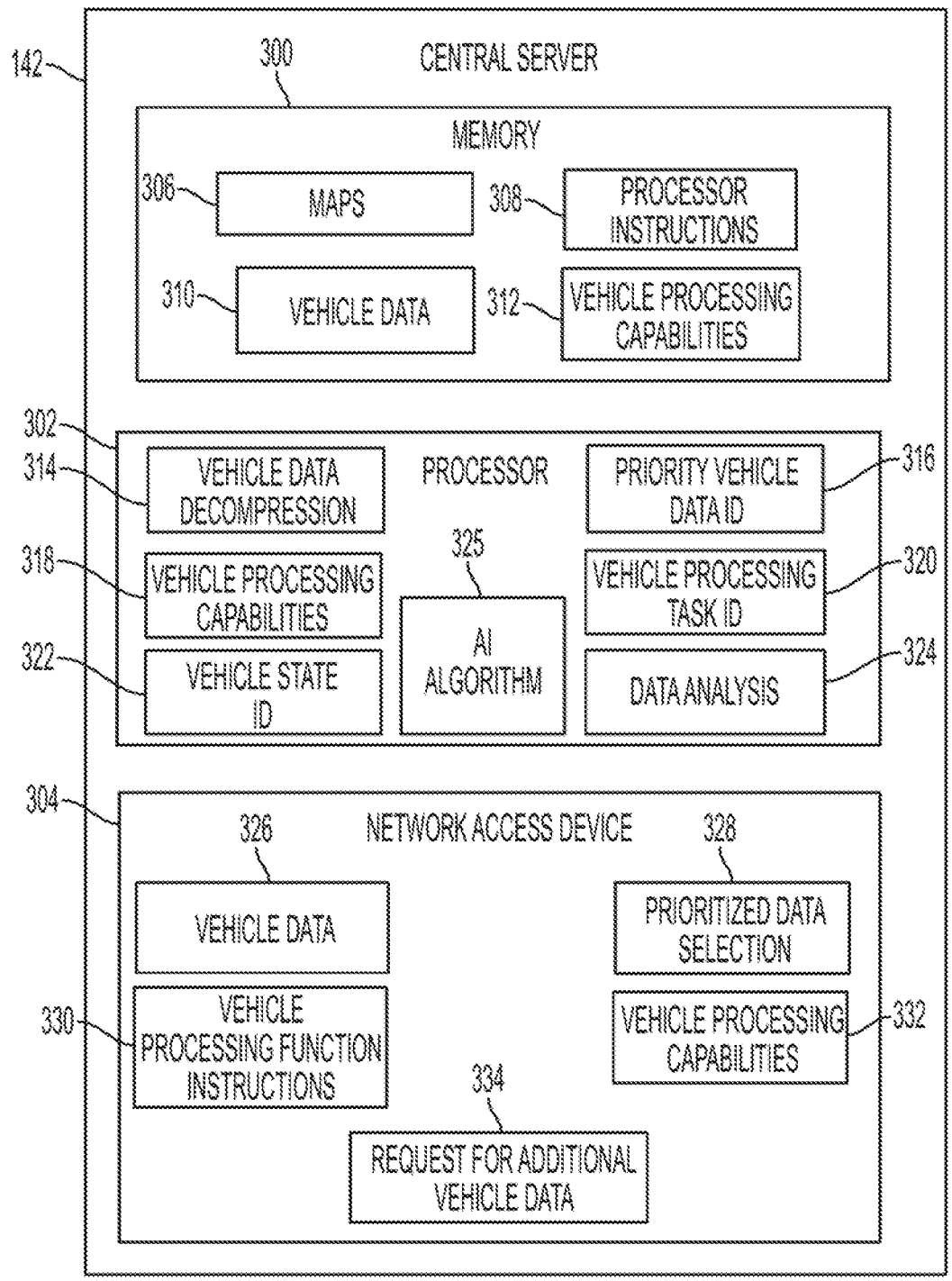
FIG. 3 is a block diagram illustrating features of a server of the system of FIG. 2, according to an embodiment of the present invention.

Referring now to FIG. 3, additional details of the remote server 142 are shown. As shown, the remote server 142 includes a non-transitory memory 300, a processor 302, and a network access device 304. The memory 300 may include any non-transitory memory capable of storing data. The processor 302 may include any controller, processor, or other discrete logic device capable of performing logic functions. In some embodiments, the processor 302 may be an artificial intelligence processor capable of performing artificial intelligence algorithms. The network access device 304 may include any network access device capable of communicating with remote devices (such as one or more of the vehicles 200 of FIG. 2). For example, the network access device 304 may communicate via Bluetooth, Wi-Fi, a cellular protocol, vehicle to vehicle (V2V) communications, Zigbee, or any other wired or wireless protocol.

The memory 300 may store various items of data, such as those shown in FIG. 3. For example, the memory 300 may store map data 306. The map data may include maps or other representations of locations and corresponding structures. For example, the maps 306 may include street maps, locations and corresponding points of interest, or the like.

The memory 300 may further store processor instructions 308. The processor instructions 308 may include machine-readable instructions usable by the processor 302 to perform functions. The processor instructions 308 may include, for example, an algorithm usable by the processor 302 to identify prioritized vehicle data to be received by the server 142. The processor instructions 308 may further include instructions for performing any of the functions or algorithms of the processor 302.

The memory 300 may further store vehicle data 310. The vehicle data 310 may include any data received from the vehicles via the network access device 304. The vehicle data 310 may include data detected by one or more sensor of one or more vehicle that is in communication with the server 142. For example, the vehicle data 310 may include image data, crash data, location data, or the like detected by various sensors of various vehicles.

The memory 300 may also store vehicle processing capabilities 312. As referenced above, the server 142 and the vehicles may operate as a distributed computing system. In that regard, it is desirable for the server 142 to be aware of the processing capabilities of each vehicle in the network. The processor 302 may assign processing tasks to vehicles based on the stored vehicle processing capabilities 312 to ensure that the specific vehicles can complete the assigned tasks.

The processor 302 may be designed to perform various functions or algorithms. For example, the processor 302 may perform a vehicle data decompression algorithm 314. The vehicle data decompression algorithm 314 may be performed by the processor 302 to decompress compressed vehicle data received from vehicles. The compression algorithm performed by the vehicles (and decompression algorithm 314) may include any data compression and decompression algorithms capable of compressing data and later decompressing the data. The vehicle data 310 stored in the memory 300 may include compressed data (e.g., from the vehicles), compressed data (e.g., as re-compressed by the processor 302), or decompressed data.

The processor 302 may further perform a priority vehicle data identification algorithm 316. The priority vehicle data identification algorithm 316 may identify types of vehicle data that are to be assigned a higher priority than other types of vehicle data. In some embodiments, the priority vehicle data identification algorithm 316 may generate an algorithm to be transmitted to the vehicles, the algorithm being usable by the vehicles to identify prioritized data. In some embodiments, the priority vehicle data identification algorithm 316 may generate a list of data types or situations that are prioritized. For example, the priority vehicle data identification algorithm 316 may indicate that any data detected 30 seconds before and 30 seconds after a wreck is prioritized data.

The processor 302 may also perform a vehicle processing capability algorithm 318. The algorithm 318 may be used by the processor 302 to identify the processing capabilities of the vehicles.

The processor 302 may further perform a vehicle processing task identification algorithm 320. The algorithm 320 may be utilized by the processor 302 in order to match processing functions to vehicles that are capable of performing the processing functions. In some embodiments, the algorithm 320 may match processing functions to vehicles that have processing capabilities that can fully, or mostly (e.g., 50 percent (50%), 80%, 90%), utilize the processing capabilities in performing the processing functions. For example, if a processing function requires 2 gigahertz (GHz) of processing power then the algorithm 320 may identify a vehicle that has 2 GHz or slightly greater of available processing capabilities.

The processor 302 may further perform a vehicle state identification algorithm 322. The vehicle state identification algorithm 322 may be used to identify a current state of a vehicle. It may be undesirable for vehicles to perform certain processing functions in certain states. For example, it may be undesirable for vehicles to perform processing functions requested by the server 142 while the vehicle is being driven, as such request may interfere with vehicle function. The algorithm 322 may identify any of multiple vehicle states. For example, the algorithm 322 may identify when the vehicle is turned on (e.g., the engine or motor are running) and traveling, may identify when the vehicle is turned on and stopped, may identify when the vehicle is turned off, may identify when the vehicle is turned off and connected to a power source, may identify a state of charge (SOC) of a vehicle battery, or the like. The vehicle processing task identification algorithm 320 may further take the vehicle states into consideration when assigning processing tasks to vehicles.

The processor 302 may also perform a vehicle data analysis algorithm 324. The algorithm 324 may aggregate and analyze the received vehicle data, as well as the result of processing tasks assigned to various vehicles in the system. For example, the algorithm 324 may analyze data received from one or more vehicle involved in a crash, and may identify one or more potential cause of the crash as well as a potential fix to avoid a similar crash in the future. As another example, the algorithm 324 may analyze data corresponding to a specific vehicle component in order to identify an improvement to hardware or software associated with the vehicle component. As yet another example, the algorithm 324 may analyze data corresponding to a handoff of vehicle control from autonomous control to driver control. The analysis may be utilized to identify situations which cause a driver (or vehicle) to feel uncomfortable with the vehicle handling certain autonomous tasks, and may be utilized to identify ways to increase driver comfort with autonomous control of such tasks.

In some embodiments, the processor 302 may be an artificial intelligence processor capable of performing one or more artificial intelligence algorithm 325. The artificial intelligence algorithm 325 may be used to perform some, none, or all of the algorithms performed by the processor 302. The artificial intelligence algorithm 325 may further be used to improve operation of any of the algorithms performed by the processor 302. For example, the artificial intelligence algorithm 325 may be trained based on one or more of past data or present data, and may be continuously updated based on newly-received data.

The network access device 304 may transmit and/or receive data from vehicles, other servers, mobile devices, or the like. The network access device 304 may receive the vehicle data 326 from one or more vehicle that is in communication with the server 142. The vehicle data 326 may be compressed and may include data that is determined to be prioritized data. The vehicle data 326 may also include lower priority data, such as that transmitted while the respective vehicle has access to low-cost data transfer.

The network access device 304 may further transmit prioritized data selection information 328. The prioritized data selection information 328 may include an algorithm usable by the vehicle to identify prioritized data, may include a list of types of prioritized data, may include activities or events around which data may be considered prioritized (e.g., data detected before and after an accident), or the like.

The network access device 304 may further transmit vehicle processing function instructions 330 to vehicles. The instructions 330 may include an instruction or request for one or more vehicle to perform one or more processing function. For example, the processor 302 may determine a number of functions to be performed by vehicles, may select one or more vehicle for each function, and the instructions 330 may include specific instructions for each vehicle to perform specific processing. In that regard, the instructions 330 may include multiple instructions each transmitted to a respective vehicle and including a request for the respective vehicle to perform a specific processing task.

The network access device 304 may receive vehicle processing capabilities 332 from one or more vehicles in the network. The capabilities 332 may include, for example, memory and processing capabilities of the vehicle, a state of the vehicle (e.g., a SOC, whether the vehicle is turned off or on, whether the vehicle is parked, or the like), or the like.

The network access device 304 may also transmit a request for additional vehicle data 334. For example, the processor 302 may identify, while performing the data analysis algorithm 324, that additional vehicle data will help with a specific data analysis function. The processor 302 may determine which additional vehicle data will help with the analysis, and may control the network access device 304 to transmit the request for additional vehicle data 334 which may include a description or identifier of the additional vehicle data that is requested, along with a time period for which the data is requested.

Figure 4:
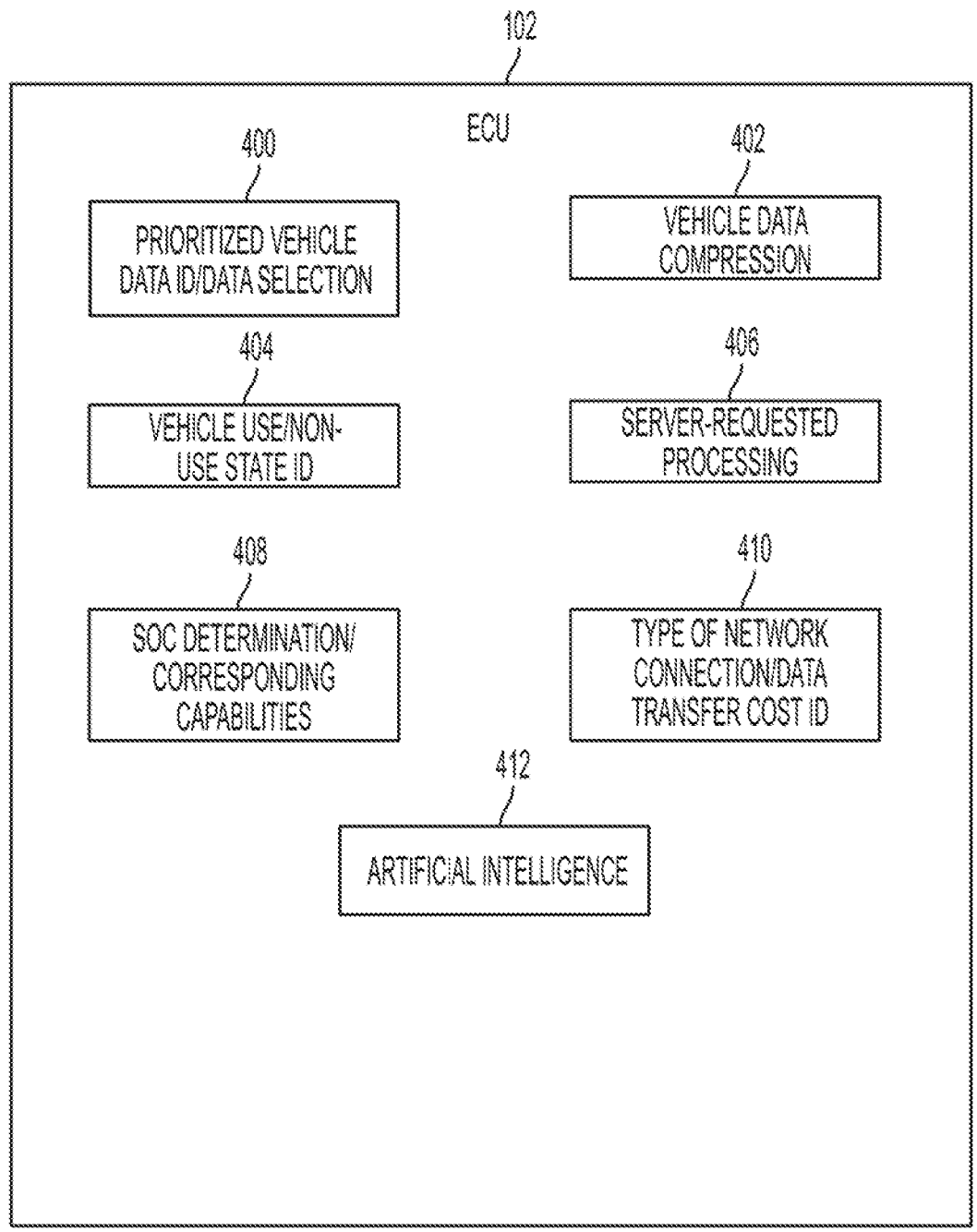
FIG. 4 is a block diagram illustrating features of an electronic control unit (ECU) of the system of FIG. 1, according to an embodiment of the present invention.

Referring now to FIG. 4, additional details of the ECU 102 are shown. In some embodiments, the ECU 102 may include automotive processors or controllers, as described above with reference to FIG. 1. In some embodiments, the ECU 102 may also or instead include a dedicated processor or controller specifically designed to perform functions related to big data collection, compression, selection, and transfer. As mentioned above, the ECU 102 may include any quantity of ECUs and some may have the same capabilities, some may have different capabilities, or the like.

The ECU 102 may be designed to perform various functions, algorithms, or tasks. In particular, the ECU 102 may perform a prioritized vehicle data identification or data selection algorithm 400. The algorithm 400 may be utilized by the ECU 102 to identify prioritized vehicle data. The algorithm 400 may take into account information provided by the server, or the algorithms 400 itself may be provided by the server.

The ECU 102 may further perform a vehicle data compression algorithm 402. The vehicle data compression algorithm 402 may compress the vehicle data that will be transmitted to the server using any compression algorithm. In some embodiments, the algorithm 402 may compress all vehicle data and store the compressed vehicle data in a memory until transmission to the server, may only compress prioritized vehicle data, may compress vehicle data that will eventually be transmitted to the server, or the like. In some embodiments, it may be desirable for the algorithm 402 to compress all vehicle data that will be transmitted to the server before the vehicle data is saved in the memory. Such compression may reduce the amount of memory necessary in the vehicle since the vehicle data will be compressed prior to storage.

In some embodiments, the ECU 102 may change or update the data compression algorithm 402. For example, the ECU 102 (or the server) may use machine learning or another algorithm to determine an optimized data compression algorithm 402. Upon determining (or receiving from the server) the optimized data compression algorithm 402, the ECU 102 may use the optimized data compression algorithm moving forward. In some embodiments, the ECU 102 may update the data compression algorithm 402 for only certain types of data for which optimization has been deemed proper.

The ECU 102 may further include a vehicle use or non-use state identification algorithm 404. The algorithm 404 may be utilized to identify a current state of the vehicle. For example, the state may include turned on and in use, turned on and parked, turned off, turned off and connected to an external power supply, a current cost of data transfer, a predicted future cost of data transfer (e.g., a prediction that the vehicle will be connected to a Wi-Fi network), or the like. The algorithm 404 may identify the state based on data detected or received by various components of the vehicle.

The ECU 102 may also perform a server requested processing algorithm 406. The server requested processing algorithm 406 may perform processing functions as requested by the server. The processing functions may include processing of vehicle data that is still stored on the vehicle, processing of vehicle data received from the server (whether from the present vehicle or another vehicle), processing of uncompressed vehicle data (before compression by the algorithm 402), processing of compressed vehicle data (after compression by the algorithm 402 were compressed vehicle data received from the server), or the like.

The ECU 102 may further perform a SOC determination/processing capability determination algorithm 408. The algorithm 408 may be performed by the ECU 102 in order to identify a current SOC of the vehicle battery. The algorithm 408 may further identify a minimum SOC for performing processing functions for the server in various situations. For example, if the vehicle is charging then the algorithm 408 may identify that the ECU 102 may perform processing for the server at any SOC. As another example, if the ECU 102 predicts that the vehicle will leave for a trip shortly then the ECU 102 may identify a minimum SOC of 80%, meaning that the ECU 102 will only perform processing functions while the SOC is at least 80%. In some embodiments, the ECU 102 may determine an amount of SOC that is necessary for the vehicle to travel along a predicted upcoming route, and may set the minimum SOC to be equal to or greater than the necessary SOC level.

In some embodiments, the vehicle may be a gasoline powered vehicle and may only include a battery to start the engine. In such embodiments, the algorithm 408 may set a minimum SOC level to be sufficiently high that the engine can be started multiple times on the remaining SOC. For example, the algorithm 408 may set the minimum SOC such that the battery can be used to restart the engine three times, with the expectation that after three starts the engine will run for sufficiently long to recharge the battery.

The algorithm 408 may further be designed to identify processing capabilities of the ECU 102. For example, the algorithm 408 may identify types of calculations which can be performed by the ECU 102, processing speed of the ECU 102, memory capabilities of the vehicle, and amount of processing that can be performed before the SOC of the batteries reaches the minimum SOC, or the like.

The ECU 102 may further perform a type of network connection/data transfer cost identification algorithm 410. The algorithm 410 may identify a present type of network connection of the vehicle or a corresponding cost of data transfer over the network connection. The ECU 102 may utilize the information learned in the algorithm 410 to determine when to send vehicle data to the server. For example, the ECU 102 may always transmit prioritized data to the server as it is received. However, the ECU 102 may wait until it is connected to a network with a relatively low data transfer cost to transmit lower priority data. In some embodiments, the ECU 102 may include multiple data priority levels (e.g., level 1 being prioritized data and level 5 being the lowest priority data), and may have a different data transfer cost associated with each level. For example, the ECU 102 may always transmit level 1 vehicle data as it is detected, may only transmit level 5 vehicle data when the vehicle 100 is connected to free Wi-Fi, and may transmit level 3 vehicle data when the vehicle is connected to a user mobile device with a relatively low data transfer cost.

The ECU 102 may be, or may include, an artificial intelligence processor and, thus, may perform an artificial intelligence algorithm 412. The artificial intelligence algorithm 412 may be used to perform any of the other algorithms or functions performed by the ECU 102. In some embodiments, the artificial intelligence algorithm 412 may be used to improve operation of the other algorithms or functions. For example, the ECU 102 may perform the artificial intelligence algorithm 412 as part of the prioritized vehicle data selection algorithm 400 in order to improve operation of the prioritized vehicle data selection algorithm 400.

Figure 5A:
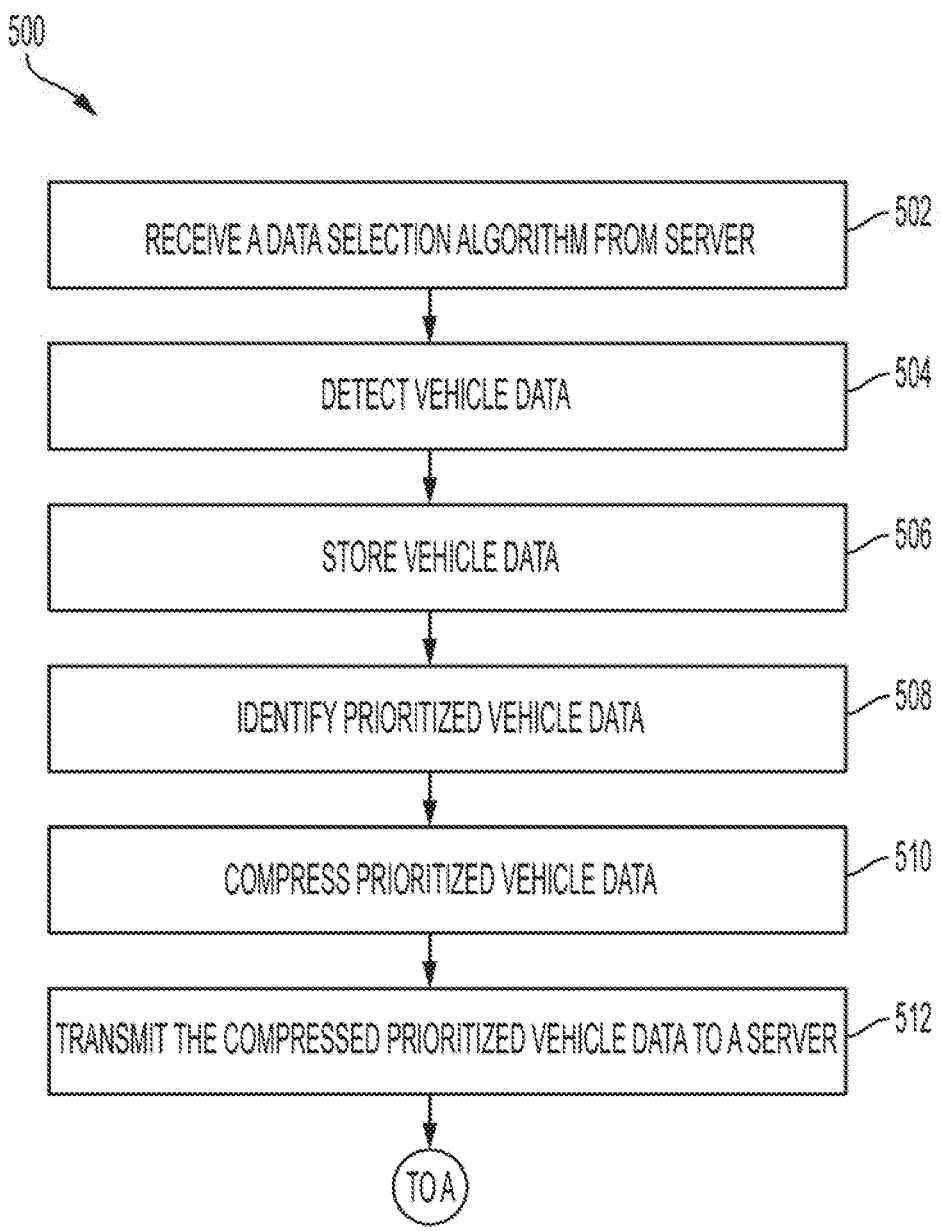
FIGS. 5A, 5B, and 5C are flowcharts illustrating a method for controlling data transfer between vehicles and a server, as performed by a vehicle, according to an embodiment of the present invention.
Figure 5B:
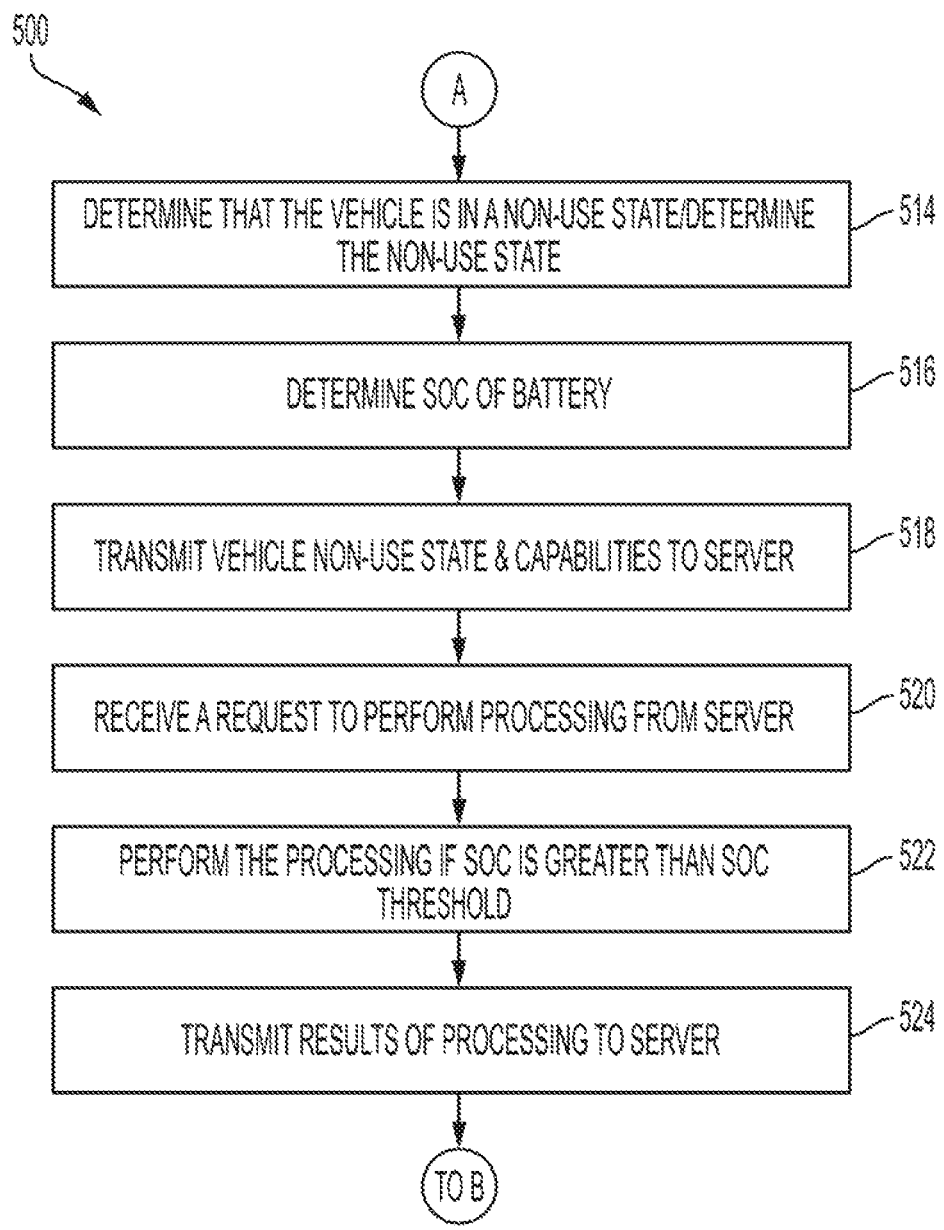
Figure 5C:
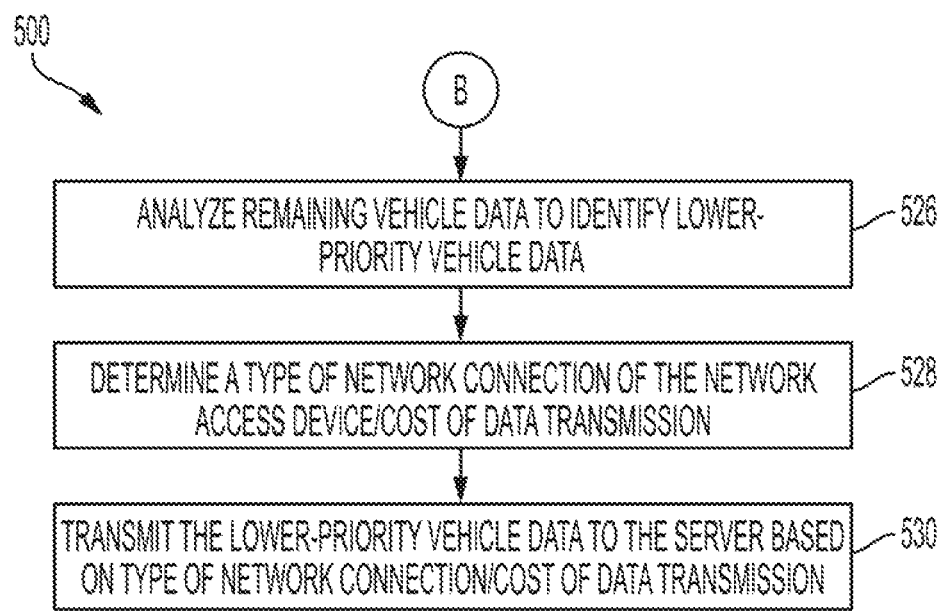

Referring now to FIGS. 5A, 5B, and 5C, a method 500 may be performed by components of a vehicle, such as the vehicle 100 of FIG. 1, to control big data transfer to a server and to function as part of a distributed processing system with the server. The method 500 may begin in block 502 where the ECU of the vehicle may receive a data selection algorithm, or data selection information, from a server. The data selection algorithm or information may include an indication of which types of vehicle data are prioritized data, which types of vehicle data are valuable but not prioritized, and which types of vehicle data can be discarded. In some embodiments, the ECU of the vehicle may already be designed to know the data selection parameters or priorities. In such embodiments, the server may or may not transmit updates to the data selection parameters to the vehicle to update the data selection algorithm.

In block 504, various sensors of the vehicle may detect vehicle data. The vehicle data may include any data detected or received by the vehicle. For example, the vehicle data may include image data detected by one or more camera, acceleration data, location data, braking activities of the driver (e.g. how much braking the driver replies), crash data, deployment of airbags, data associated with a driver taking control from an autonomous vehicle, or the like.

In block 506, the ECU may control a memory of the vehicle to store the vehicle data. In some embodiments, the ECU may compress the vehicle data prior to storing and, in some embodiments, the ECU may store the vehicle data prior to compression.

In block 508, the ECU (utilizing the data selection algorithm) may identify prioritized vehicle data. For example, the ECU may compare each of the types of vehicle data to identifiers of prioritized vehicle data to identify which items of the vehicle data are prioritized. In some embodiments, multiple levels of priority may exist. In such embodiments, the ECU may assign each element of vehicle data to a priority level in block 508.

In block 510, the ECU may compress the prioritized vehicle data using any compression algorithm. In some embodiments, the ECU may compress any vehicle data that the ECU may store or eventually transmit to the server in block 510.

In block 512, the ECU may control a network access device to transmit the compressed prioritized vehicle data to a server. The prioritized vehicle data may be transmitted using any network connection, although the ECU may control the network access device to transmit the prioritized vehicle data using a currently-available lowest-cost data connection. In some embodiments, if the ECU is connected to Wi-Fi or another low-cost data connection then the ECU may control the network access device to also transmit lower priority data to the server.

In block 514, the ECU may determine a current state of the vehicle. For example, the ECU may determine whether the vehicle is currently in use or in a non-use state. The ECU may determine the use state in a more granular level such as whether the vehicle is parked, whether the vehicle is turned off, whether the vehicle is plugged into an external power source, or the like.

In block 516, the ECU may determine a SOC of the battery. For example, various sensors may be coupled to the battery and the ECU may determine the current SOC based on the data detected by the sensors.

In block 518, the ECU may control the network access device to transmit the current vehicle state as well as the vehicle processing capabilities to the server.

In block 520, the ECU may receive a request to perform one or more processing function from the server. The processing function may include processing vehicle data from the vehicle or vehicle data from remote vehicles. The processing function may also or instead include processing functions on data other than the raw vehicle data, as requested by the server.

In block 522, the ECU may determine whether to perform the processing (based on a current vehicle state and a current SOC of the vehicle) and may perform the processing. For example, if the current state of charges of the vehicle is below a minimum SOC for performing processing functions then the ECU may transmit a notification to the server that the ECU cannot currently perform the requested processing function. The ECU may continue to monitor the SOC and may stop performing the processing function if the SOC reaches or drops below the minimum SOC.

In block 524, the ECU may transmit the results of the processing back to the server. In some embodiments, the ECU may compress the results of the processing prior to transmission to the server.

In block 526, the ECU may analyze the remaining vehicle data and may assign priority levels to the remaining vehicle data, if not completed already.

In block 528, the ECU may determine a current type of network connection or a corresponding cost of data transmission over the current network connection.

In block 530, the ECU may control the network access device to transmit some or all of the lower priority vehicle data to the server based on the type of network connection or the corresponding cost of data transmission.

Figure 6A:
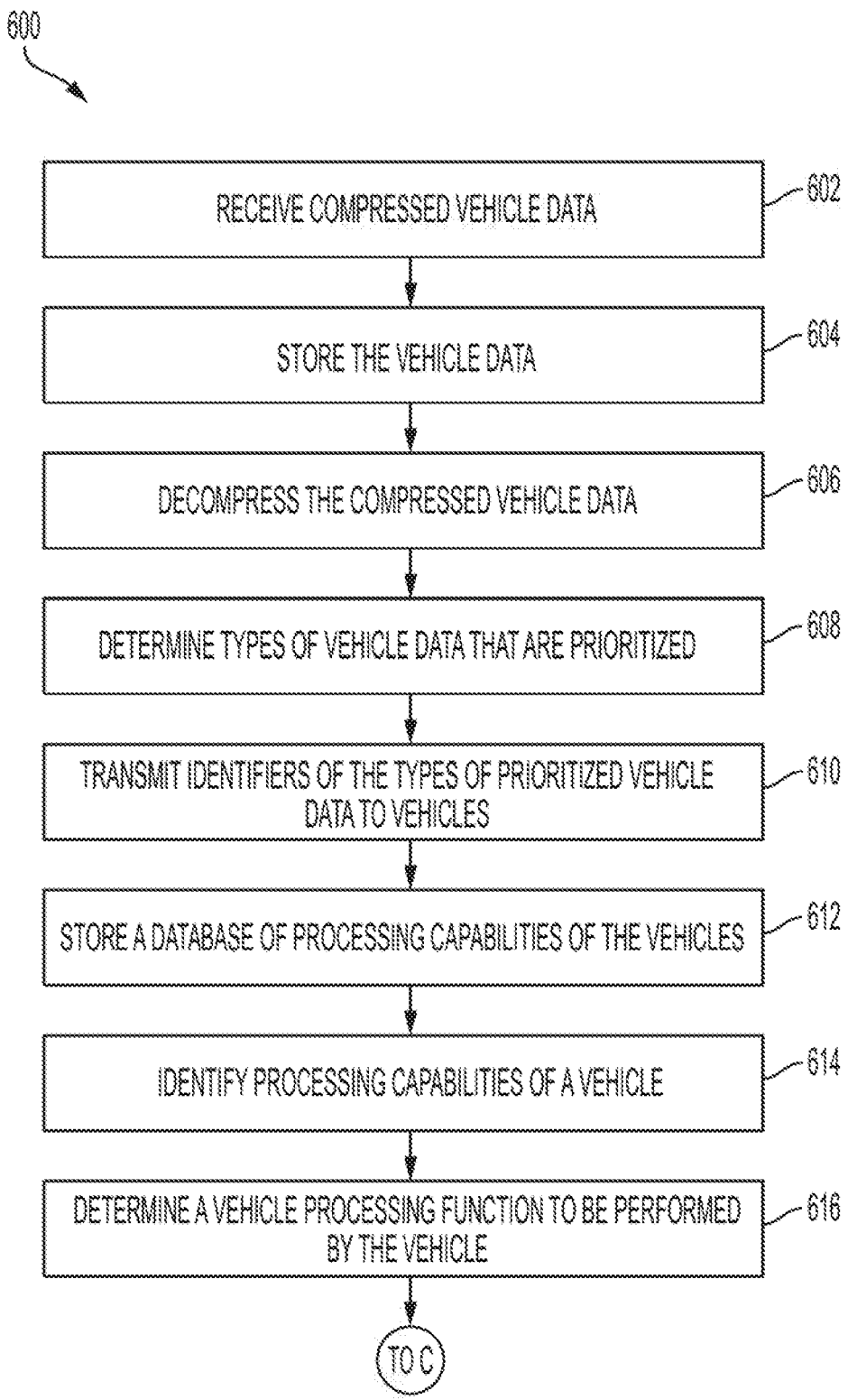
FIGS. 6A and 6B are flowcharts illustrating a method for controlling data transfer between vehicles and a server, as performed by a server, according to an embodiment of the present invention.
Figure 6B:
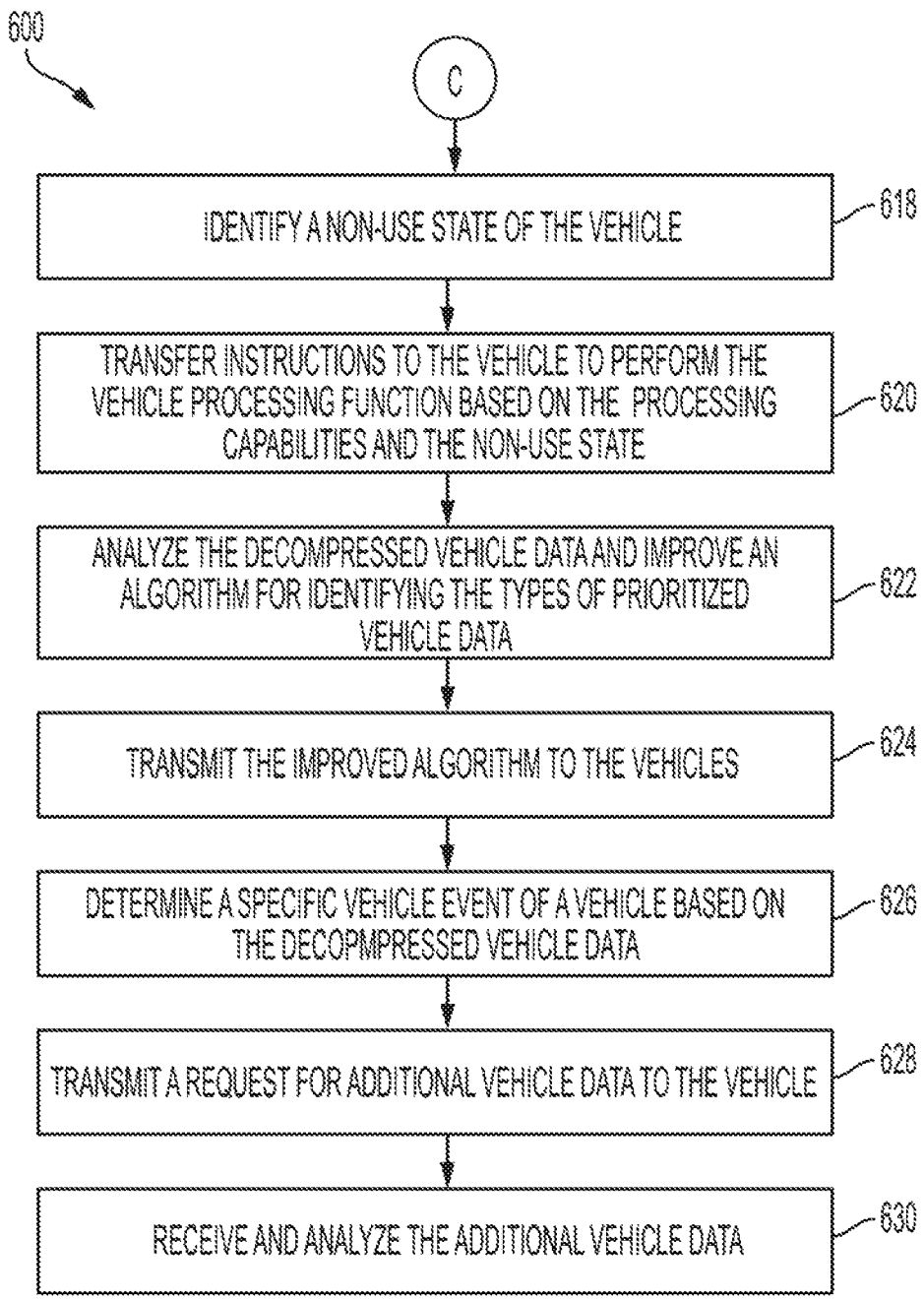

Referring now to FIGS. 6A and 6B, a method 600 may be performed by a server to aid in controlling big data transfer from the vehicles to the server, as well as to control a distributed processing system including the server and the vehicles. The method 600 may begin in block 602 where the server may receive compressed vehicle data from the vehicles. The compressed vehicle data may include prioritized vehicle data as well as lower priority vehicle data.

In block 604, the server may store the vehicle data in an associated memory or database. The data may be non-partitioned or partitioned based on various factors such as type of vehicle, specific vehicle, vehicle make, or the like. For example, some data may be associated with a specific Toyota Prius, and the same data may also be associated with Toyota Prius vehicles in general.

In block 606, the compressed vehicle data may be decompressed by the processor. In some embodiments, the vehicle data may be decompressed prior to being stored in block 604.

In block 608, the server may identify types of vehicle data that are prioritized. The server may continuously learn (e.g., using an artificial intelligence algorithm) which type of data has higher priority as it processes current data. For example, as the processor is processing data, it may discover an association between types of data that were previously believed to have no association. In some embodiments, the server may also identify priority levels for each type of data.

In block 610, the server may transmit identifiers of the types of prioritized vehicle data to the vehicles. In some embodiments, the server may generate an algorithm which the vehicles may use to automatically identify the priority of the vehicle data. In such embodiments, the server may transmit the algorithm to the vehicles from time to time or as the algorithm becomes updated.

In block 612, the processor may store a database of processing capabilities of each vehicle in the network. The database may be updated as vehicles are added to the network or as vehicle capabilities change (e.g., a vehicle may receive a software update that increases efficiency of processing by the vehicle). In some embodiments, the server may be aware of processing capabilities of each vehicle make and model and may automatically populate the processing capabilities as a new vehicle of the make and model is added to the network.

In block 614, the server may identify processing capabilities of a specific vehicle, and may also identify processing tasks which can be performed by vehicles in the network. In block 616, the server may match the identified processing tasks to vehicles that are capable of performing the processing tasks. For example, the server may identify a specific data analysis task that can be performed by a vehicle, and then may identify a vehicle that has the capabilities to perform the data analysis task.

In block 618, the server may identify a current state of the identified vehicle. For example, the state may be currently driven, on but parked, off, plugged into a power supply, or the like.

In block 620, the server may transmit instructions to the identified vehicle to perform the identified vehicle processing function. In some embodiments, the server may only transmit the instructions to the vehicle when the vehicle is in one or more specified state. For example, the server may only transmit the instructions to the vehicle when the vehicle is turned off. As another example, if the processing function is relatively processing-intensive, the server may only transmit the processing function if the vehicle is turned off and plugged into an external power supply.

In block 622, the server may analyze the decompressed vehicle data. The server may analyze the decompressed vehicle data for any reason, such as to identify a cause of an accident, to aid in modeling or design of vehicles or vehicle features, to identify changes to vehicle design that may increase driver comfort, or the like.

In some embodiments, the server may further utilize the analysis to improve an algorithm for identifying priority of the vehicle data. For example, after analysis of the vehicle data, the server may determine that additional types of data should be prioritized and that some currently-prioritized data may in fact not be useful. In some embodiments, the server may create a list of prioritized vehicle data types, may generate or update an algorithm usable by the vehicles to identify prioritized vehicle data, or the like.

In block 624, the server may transmit the list of prioritized vehicle data types or the algorithm to one or more vehicle. The one or more vehicle may use the list or the algorithm to identify prioritized vehicle data moving forward.

In block 626, the server may identify a specific vehicle event of a specific vehicle based on the analysis of the decompressed vehicle data. For example, the server may analyze the vehicle data and may determine that the specific vehicle has been involved in an accident. As another example, the server may analyze the vehicle data and may determine that the driver has regained control of the vehicle from autonomous control by the ECU. As yet another example, the server may identify failure of a vehicle component based on the data analysis.

In some embodiments, the server may determine that additional data may be useful in analyzing the specific vehicle event. For example, the server may identify that image data immediately before and immediately after the event would assist in analyzing the vehicle event. In that regard and in block 628, the server may transmit a request for the additional vehicle data to the specific vehicle.

In block 630, the server may receive the additional vehicle data from the vehicle and may analyze the additional vehicle data. For example, the server may analyze the additional vehicle data in order to determine a root cause of the specific vehicle event.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling big data transfer from a vehicle to a server, the system comprising:
    a plurality of vehicle sensors located on the vehicle and configured to detect vehicle data;
    a memory located on the vehicle and configured to store the vehicle data;
    a network access device located on the vehicle and configured to communicate with the server; and
    an electronic control unit (ECU) located on the vehicle, coupled to the plurality of vehicle sensors, the memory, and the network access device, and configured to:
        analyze the vehicle data to identify prioritized vehicle data and other vehicle data within the vehicle data,
        compress the prioritized vehicle data,
        control the network access device to transmit the compressed prioritized vehicle data to the server,
        determine that the vehicle is in a non-use state when the vehicle is at least one of stopped, parked, or powered off,
        obtain data relating to available capabilities of the ECU,
        control the network access device to transmit a notification to the server when the vehicle is in the non-use state,
        control the network access device to transmit the obtained data relating to the available capabilities of the ECU to the server, and
        receive and process a request to only perform processing that the ECU is capable of performing based on the available capabilities of the ECU.

2. The system of claim 1, wherein the ECU is further configured to:
    perform the processing in response to the receipt of the request; and control the network access device to transmit a result of the processing to the server based on the performance of the processing; and wherein the request includes a request to perform processing of at least one of (i) some of the vehicle data or (ii) other vehicle data from other vehicles when the vehicle is in the non-use state.

3. The system of claim 1, further comprising a battery located on the vehicle and configured to store electrical energy, wherein the ECU is further configured to determine a state of charge (SOC) of the battery and to prevent the ECU from performing the processing when the SOC of the battery is below a threshold SOC level.

4. The system of claim 1, wherein the network access device is further configured to receive a data selection algorithm from the server, and the ECU is further configured to identify the prioritized vehicle data by analyzing the vehicle data using the data selection algorithm that was received by the network access device.

5. The system of claim 4, wherein the data selection algorithm is an artificial intelligence algorithm that was trained using historical vehicle data.

6. The system of claim 1, wherein the ECU is further configured to:
analyze the other vehicle data to identify lower-priority vehicle data from the other vehicle data, the lower-priority vehicle data having a lower priority than the prioritized vehicle data;
determine at least one of a type of internet connection of the network access device or a data transfer cost of transmitting data over the internet connection; and
control the network access device to transmit the lower-priority vehicle data to the server when at least one of the type of the internet connection is a predetermined connection type or the data transfer cost is less than a threshold cost.

7. The system of claim 1, wherein the analysis of the vehicle data comprises identification of data relating to at least one of a crash in which the vehicle was involved, a vehicle component, or a handoff of vehicle control between autonomous control and driver control, and wherein the vehicle data comprises at least one of image data, crash data, location data, or sensor data.

8. A system for controlling big data transfer from a vehicle to a server, the system comprising:
a network access device located at the server and configured to receive compressed vehicle data corresponding to sensor data detected by sensors of multiple vehicles;
a memory located at the server and configured to store at least one of the compressed vehicle data or uncompressed vehicle data; and
a data processor located at the server, coupled to the network access device and the memory, and configured to:
decompress the compressed vehicle data into the uncompressed vehicle data,
analyze the decompressed vehicle data to identify types of vehicle data that are prioritized vehicle data, and
control the network access device to transmit identifiers of the prioritized vehicle data to the multiple vehicles such that future compressed vehicle data from the multiple vehicles includes the prioritized vehicle data.

9. The system of claim 8, wherein the data processor is further configured to:
identify processing capabilities of a vehicle of the multiple vehicles;
determine a vehicle processing function corresponding to processing of vehicle data for the vehicle to perform based on the processing capabilities of the vehicle; and
control the network access device to transfer instructions to the vehicle for the vehicle to perform the vehicle processing function.

10. The system of claim 9, wherein at least one of:
the vehicle processing function is configured to be performed on the vehicle data before the vehicle data is compressed and transmitted to the network access device; or
the vehicle processing function is configured to be performed on the vehicle data after the vehicle data is compressed and transmitted to the network access device.

11. The system of claim 9, wherein at least one of:
the memory is further configured to store a database of processing capabilities for the multiple vehicles and the data processor is further configured to identify the processing capabilities of the vehicle by comparing an identifier of the vehicle to data stored in the database; or
the network access device is further configured to receive the processing capabilities of the vehicle and the data processor is further configured to identify the processing capabilities of the vehicle based on the received processing capabilities.

12. The system of claim 9, wherein the network access device is further configured to receive data indicative of a current non-use state of the vehicle, and wherein the data processor is further configured to identify the current non-use state of the vehicle and to determine the vehicle processing function based on the current non-use state of the vehicle.

13. The system of claim 12, wherein the current non-use state includes at least one of:
the vehicle being stopped and powered on;
the vehicle being stopped and powered off without external power supply; or
the vehicle being stopped, powered off, and connected to an external power supply.

14. The system of claim 8, wherein the data processor is further configured to perform an artificial intelligence algorithm to continuously or periodically analyze the decompressed vehicle data and improve a process for identifying the types of vehicle data that are the prioritized vehicle data.

15. The system of claim 8, wherein the data processor is further configured to determine a specific vehicle event corresponding to a vehicle of the multiple vehicles based on the decompressed vehicle data and to control the network access device to transmit a request for additional vehicle data to the vehicle in response to determining the specific vehicle event.

16. A method for controlling big data transfer from a vehicle to a server, the method comprising:
detecting, by a plurality of vehicle sensors located on the vehicle, vehicle data;
storing, in a memory located on the vehicle, the vehicle data;
analyzing, by an electronic control unit (ECU) located on the vehicle, the vehicle data to identify prioritized vehicle data and other vehicle data within the vehicle data;
analyzing, by the ECU, the other vehicle data to identify lower-priority vehicle data from the other vehicle data, the lower-priority vehicle data having a lower priority than the prioritized vehicle data;

compressing, by the ECU, the prioritized vehicle data;

transmitting, by a network access device on the vehicle, the compressed prioritized vehicle data to the server;

determining, by the ECU, at least one of a type of internet connection of the network access device or a data transfer cost of transmitting data over the internet connection; and transmitting, by the network access device, the lower-priority vehicle data to the server when at least one of the type of the internet connection is a predetermined connection type or the data transfer cost is less than a threshold cost.

17. The method of claim 16, further comprising:

determining, by the ECU, that the vehicle is in a non-use state when the vehicle is at least one of stopped, parked, or powered off;

transmitting, by the network access device, a notification that the vehicle is in the non-use state to the server;

receiving, by the ECU, a request to perform processing of at least one of (i) some of the vehicle data or (ii) other vehicle data from other vehicles;

performing, by the ECU, the processing; and transmitting, by the network access device, a result of the processing to the server.

18. The method of claim 17, further comprising:

storing, in a battery located on the vehicle, electrical energy;

determining, by the ECU, a state of charge (SOC) of the battery; and preventing, by the ECU, the ECU from performing the processing when the SOC of the battery is below a threshold SOC level.

19. The method of claim 16, further comprising:

receiving, by the network access device, a data selection algorithm from the server; and identifying, by the ECU, the prioritized vehicle data by analyzing the vehicle data using the data selection algorithm that was received by the network access device.

* * * * *